United States Patent [19]

Antoku et al.

[11] 4,282,713
[45] Aug. 11, 1981

[54] CONTROL FOR SUPERCHARGER TURBINES

[75] Inventors: Mitugu Antoku; Fumio Saito, both of Yokohama, Japan

[73] Assignee: Nissan Motor Company, Limited, Yokohama, Japan

[21] Appl. No.: 910,145

[22] Filed: May 26, 1978

[30] Foreign Application Priority Data

May 26, 1977 [JP] Japan ................. 52-60509

[51] Int. Cl.³ ............................................. F02B 37/00
[52] U.S. Cl. ..................................................... 60/600
[58] Field of Search ................. 60/600, 601, 602, 603, 60/611; 123/119 C

[56] References Cited

U.S. PATENT DOCUMENTS

| | | | |
|---|---|---|---|
| 2,390,166 | 12/1945 | Parkins et al. | 123/559 X |
| 2,559,623 | 7/1951 | Holmes | 60/600 X |
| 3,035,408 | 5/1962 | Silver | 60/602 |
| 3,195,805 | 7/1965 | Cholvin et al. | 60/602 X |
| 3,196,606 | 7/1965 | Cholvin et al. | 60/611 |
| 3,233,403 | 2/1966 | MacInnes et al. | 60/602 |
| 3,257,796 | 6/1966 | Updike | 60/602 |
| 3,568,435 | 3/1971 | May | 60/611 X |
| 3,906,729 | 9/1975 | Connor et al. | 60/600 |
| 3,941,035 | 3/1976 | Mueller | 60/602 X |
| 3,949,551 | 4/1976 | Eichler et al. | 60/274 |
| 3,973,529 | 8/1976 | Wessel et al. | 60/276 X |
| 4,044,560 | 8/1977 | Dorsch et al. | 60/603 X |

FOREIGN PATENT DOCUMENTS

| | | | |
|---|---|---|---|
| 2435707 | 2/1976 | Fed. Rep. of Germany | 60/611 |
| 2549934 | 5/1977 | Fed. Rep. of Germany | 60/600 |

Primary Examiner—Michael Koczo, Jr.
Attorney, Agent, or Firm—Schwartz, Jeffery, Schwaab, Mack, Blumenthal & Koch

[57] ABSTRACT

A portion of the exhaust gases is bypassed around the turbine when the induction pressure developed downstream of a throttle valve rises to a predetermined magnitude and drops to another predetermined magnitude. Besides, a portion of induction air under supercharge pressure is recycled to the inlet of a compressor in response to the induction pressure downstream of the throttle valve.

12 Claims, 3 Drawing Figures

CONTROL FOR SUPERCHARGER TURBINES

This invention relates to an improved waste gate control of a turbosupercharger particularly adapted for an automotive internal combustion engine.

BACKGROUND OF THE INVENTION

Superchargers of the type having a turbine driven by engine exhaust gas flow and a compressor driven by the turbine are today widely employed in automotive engines by virtue of several excellent features, for instance, reducing fuel comsumption and suppressing formation of $NO_x$.

When employing such superchargers in automotive vehicles, it is essential to control the outlet pressure of the compressor or supercharge pressure to an appropriate level by so-called waste gate control, because the engine will knock under excessively high supercharge pressure.

Several types of waste gate controls have been known, one of which is exemplarily disclosed in U.S. Pat. No. 3,035,408 to Alexander Silver et al filed Jan. 4, 1960 and patented May 22, 1962. According to this prior waste gate control, a passage is provided around the turbine for bypassing a portion of the exhaust gases. A by-pass control valve controls exhaust gas flow through the passage in dependence on the ratio of the compressor outlet pressure to the compressor inlet pressure and also on the exhaust gas pressure, so that the turbine driving speed is controlled not to exceed a proper level.

However, such and other waste gate controls are not expedient to reduce the supercharge pressure during engine deceleration. In general, the engine with turbo-supercharger has only a poor response to the engine decelerating condition because of its lengthy control cycle. As a vehicle operator abruptly moves the throttle valve to closed position for engine braking effect, the existing high exhaust gas pressure continues to drive the turbine so that the compressor produces yet a high supercharge pressure. It will take a considerable time until the supercharge pressure drops enough for deceration, resulting in a time delay from operator's shifting to deceleration to actual deceleration of the engine. During such delay, the turbine has to do extra work which is not exploited for the engine output power.

OBJECTS OF THE INVENTION

It is a general object of this invention to provide an improved waste gate control for turbosuperchargers of internal combustion engines controlling the compressor outlet pressure or supercharge pressure to a proper level by bypassing a portion of the exhaust gases around the turbine.

Another more specific object of the invention is to control the supercharge pressure generated at the turbosupercharger in dependence on the engine induction pressure prevailing in the section downstream of the throttle valve to facilitate the engine deceleration operation.

Still another object of the invention is to provide a waste gate control of the character mentioned above which can bypass a portion of the exhaust gases around the turbine both when the induction pressure prevalent at the downstream of the throttle valve, which corresponds to the supercharge pressure with the throttle valve wide open, exceeds a predetermined magnitude above the atmospheric pressure and when the induction pressure drops to another predetermined magnitude below the atmospheric pressure when the throttle valve is substantially closed.

A further object of the invention is to provide an improved waste gate control which, besides bypassing the exhaust gases, returns a portion of the induction air at the outlet of the compressor to the inlet thereof at a rate dependent on the induction pressure downstream of the throttle valve.

A still further object of the invention is to provide a waste gate control of the character described above which is easily applicable to existing engines with turbosuperchargers with minimum structural modification.

A still further object of the invention is to provide an improved combination of an electronically controlled fuel injection type internal combustion engine comprising a waste gate control of the character described above, an exhaust gas recirculation control, a blow-by gas control and an exhaust gas cleaning apparatus.

SUMMARY OF THE INVENTION

It is therefore an important feature of the invention that the waste gate control is effective to reduce the supercharge pressure when it exceeds a predetermined magnitude, above which undesirable phenomena such as engine knocking may occur, and also during decelerating operation in which engine induction pressure drops largely below the atmospheric pressure, irrespective of whether the supercharge pressure just at the outlet of the compressor exceeds the predetermined magnitude or not. To this end, the waste gate control of the invention comprises a passage for bypassing exhaust gases around the turbine, a by-pass control valve, and control means operated from the induction pressure prevailing in the section downstream of the throttle valve, which substantially corresponds to the supercharge pressure at the outlet of the compressor when the throttle valve is wide open, but which falls below the atmospheric pressure when the throttle valve is closed. It is preferable to install, besides the exhaust gas bypassing apparatus, an induction air recirculation apparatus which returns a portion of the induction air at the outlet of the compressor to the inlet of the compressor in dependence on the induction pressure in the section downstream of the throttle valve. This further reduces the supercharge pressure in good response to the engine deceleration and maintains the supercharge pressure at a proper level.

Other objects, features and many advantages resulting from the invention will be apparent from the following description with respect to preferred embodiments, though the invention is not limited to these embodiments and various changes and modifications are possible within the scope of the invention.

The explanation is made with reference to the accompanying drawings in which

DETAILED DESCRIPTION OF THE EMBODIMENT

Figure 1:
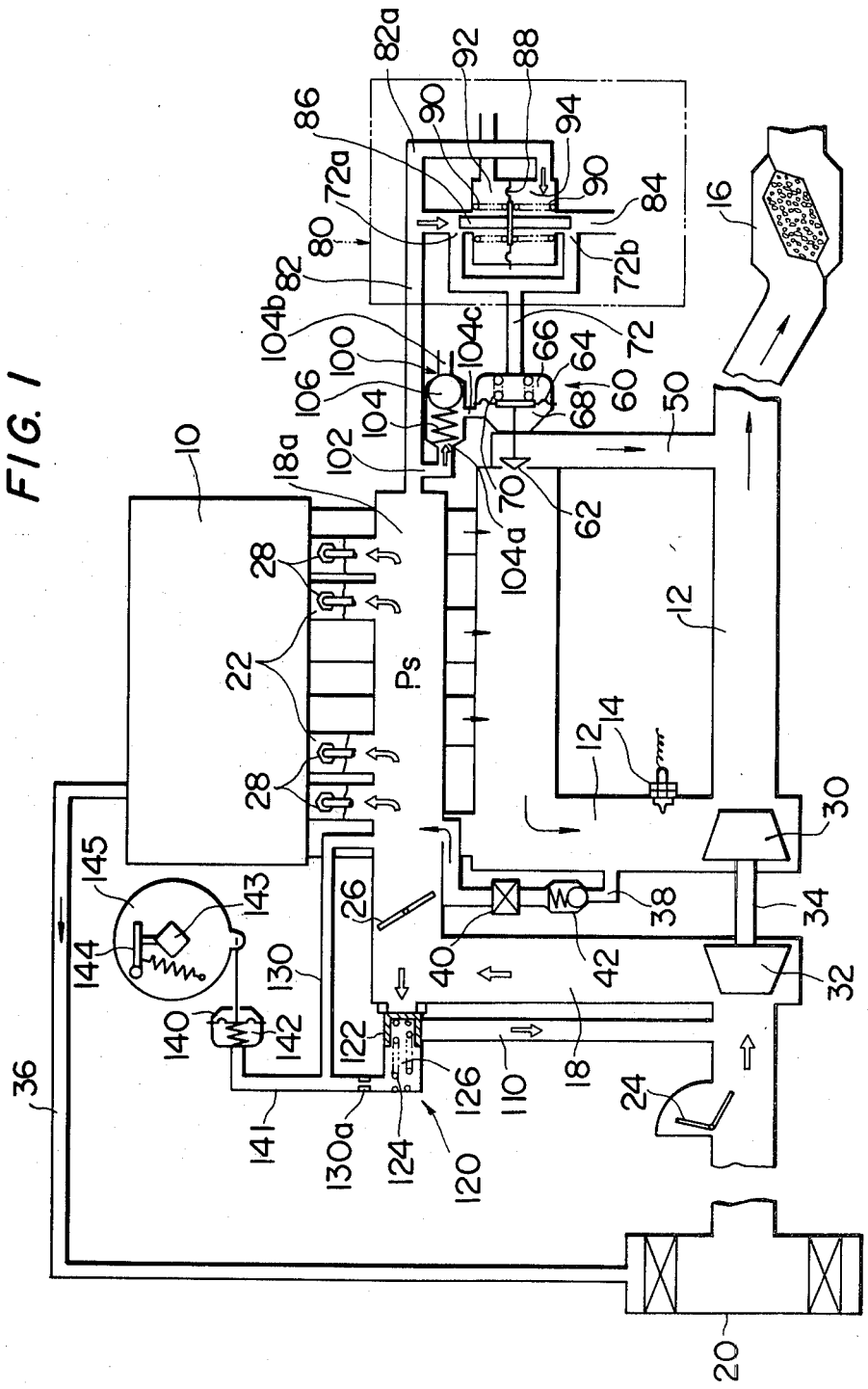
FIG. 1 is a schematic view illustrating a first preferred embodiment of the invention.

In FIG. 1, generally indicated by numeral 10 is an electronically controlled fuel injection type internal combustion engine with an exhaust system 12 which as is conventional includes an exhaust manifold and an exhaust pipe. The exhaust system preferably accommodates an exhaust gas sensor 14 as well as a three-way catalytic converter 16 for the well known purpose. An induction passage 18 draws the fresh air through an air cleaner 20 and conveys it to an intake manifold 22 via an air flow meter 24 and a throttle valve 26 in a known manner. Fuel injection valves 28 are installed in respective branches of the intake manifold 22 leading to the engine combustion chambers.

The quantity of fuel supplied by the injection valves 28 mainly depends on the quantity of induction air detected by the air flow meter 24. Besides, the amount of fuel delivered to the combustion chambers is adjusted in accordance with the signal from the exhaust gas sensor 14, and other various signals such as those representing the induction air temperature, engine coolant temperature, and lubricating oil temperature, though sensors for these signals are not shown. Thus, the air/fuel ratio of the input mixture is optimumly controlled in precise response to the engine operation through any suitable controller (not shown) having at its inputs these engine parameter signals. Systems for controlling the air/fuel ratio of the intake mixture in response to an exhaust gas sensor, an air flow meter, engine throttle position, and other parameters are known, for example, from U.S. Pat. No. 3,949,551 issued Apr. 13, 1976 to Eichler et al, and U.S. Pat. No. 3,973,529, issued Aug. 10, 1976, to Wessel et al.

A turbosupercharger is as known per se comprised of a turbine 30 located in the exhaust passage 12 and a compressor 32 located in the induction passage and driven through a shaft 34 by the turbine 30. The rotating turbine drives the compressor to pressurize the air in the induction passage. The air under supercharge pressure at the compressor outlet is then forced to the combustion chambers through the induction passage past the fuel injection nozzles 28, at which the quantity of fuel is matched with the quantity of air as already mentioned.

The illustrated engine is further associated with a crankcase ventilation system (not entirely shown) by which blow-by gases are fed back to the air filter 20 through a conduit 36. The provision of the crankcase ventilation system is particularly desirable for the engine with turbosupercharger where the pressure in the combustion chambers and therefore the amount of the combustion chamber gas forced past pistons and rings rises to a greater degree than in other types of engine lacking a supercharger.

It is also preferable to install an exhaust recirculation system to feed back a portion of the exhaust gases into the induction air, thus restraining the combustion temperature. In practice, a portion of the exhaust passage 12 upstream of the turbine 30 is connected with a portion of the induction passage 18 downstream of the throttle valve 26 by means of an EGR conduit 38, the flow area of which is controlled by an EGR control valve 40. The EGR conduit further accommodates a one-way valve 42 which opens by the exhaust pressure higher than the supercharge pressure, while preventing the induction air from flowing into the exhaust passage when the supercharge pressure is higher than the exhaust gas pressure.

While the foregoing description pertains to the known arrangement of internal combustion engine with turbosupercharger, a waste gate control according to the preferred embodiments of the invention will be hereinafter explained as combined with the engine of the aforementioned type.

In FIG. 1, a by-pass around the turbine 30 is provided by a conduit 50 which is controlled by a by-pass flow control valve assembly 60. A valve with head 62 is rigidly connected with a diaphragm 64 which separates two pressure chambers 66, 68 from each other. The diaphragm 64 is forced in a direction to close the valve 62 by the load of a spring 70. The chamber 66 of the valve assembly is fluidly connected with a first controller 80 by means of a conduit 72. The first controller 80 is operable from the pressure in a conduit 82 which directly communicates with the induction passage section 18a downstream of the throttle valve 26 and from the atmospheric pressure, in a manner as will be further described. A second controller 100 is interposed in a conduit 102 connecting the chamber 68 to the induction passage section 18a.

The conduit 72 from the valve assembly 60 diverges into two branches which at their ports 72a and 72b parallelly open to a conduit 84 connecting the conduit 82 to the atmosphere. Between two ports 72a and 72b is disposed a plate valve assembly including a plate member 86 which is located within the conduit 84 to cover neither of the ports 72a and 72b in its rest position. To the center parts of the plate member 86 is secured a diaphragm 88 which is loaded by springs 90 in opposing directions. There are chambers 92 and 94 across the diagram 88, of which 92 directly communicates with the atmosphere and 94 with the conduit 82 by means of a branch conduit 82a. The plate member 86 is thus reciprocally movable by combined forces of springs 90, atmospheric pressure and supercharge pressure to alternatively close port 72a or port 72b.

The second controller 100 comprises a fluid chamber 104 connected at one port 104a with a conduit 102 and opens to the atmosphere through another port 104b which can be blocked by a spring-loaded ball type check valve member 106 disposed in the chamber 104. The latter further communicates at another port 104c with the chamber 68 of the valve 60 for selectively admitting into the chamber 68 the induction air in the conduit 82 through the port 104a and the atmospheric air through the port 104b when the ball member 106 is sufficiently removed from the port 104b.

The bypass control valve 60 and its associated controllers 80 and 100 operate to control the bypass exhaust gas flow in a manner to be described below.

At normal cruising speed of the engine, the supercharge pressure $P_s$ in the induction passage section 18a is relatively low but is enough to force the diaphragm 88 upward in the drawing when transferred to the chamber 94 by proper setting of load of springs 90. The plate valve 86 is therefore partially or fully removed from the port 72b while partially or fully blocking the port 72a. Then the pressure which is between $P_s$ and atmospheric pressure due to the partial or full opening of both ports 72a and 72b is introduced through conduit 72 into the chamber 66. In the chamber 68 exists the aforementioned pressure $P_s$ delivered through the second controller 100, in which the ball member 106 maintains the port 104b closed. However, as there is no significant pressure difference across the diaphragm 64 at this time, the valve 62 is maintained so as to obstruct the bypass conduit 50 by the action of the spring 70. No bypass flow will occur and the whole kinetic energy of the exhaust gases is utilized to drive the turbine.

As the engine speed rises for instance above 2800 rpm, the increased turbine driving force of the exhaust gases fully runs the turbine so that the supercharge pressure at the compressor outlet will rise, for instance, to 400 mmHg above the atmospheric pressure. This pressure, almost unchanged, is conveyed to the induction passage section downstream of the throttle valve by virtue of the wide-open throttle valve. The induction air under such a high pressure $P_s$ is then transferred into the chamber 94 of the first controller 80 and raises completely the diaphragm 88, overcoming the atmospheric pressure and load of the spring in the chamber 92. The plate member 86 accordingly moves upward in the drawing and restricts or blocks the area of the port 72a. The port 72b is now correspondingly wide-open so that the atmospheric air only is admitted into the chamber 66.

Figure 2:
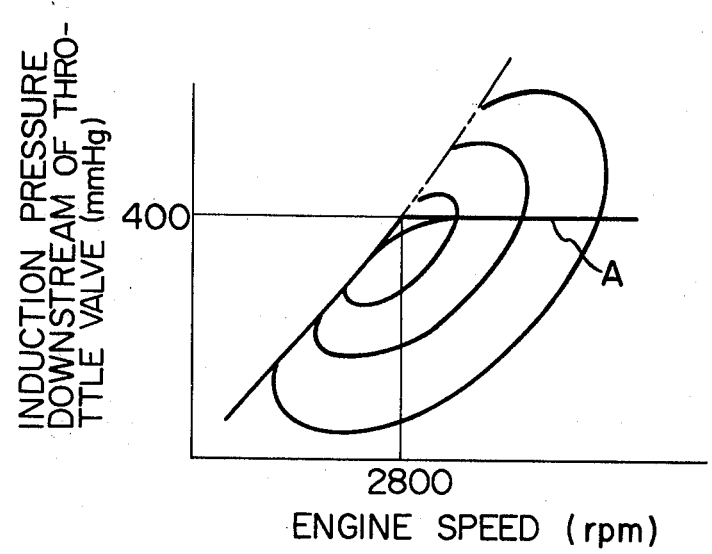
FIG. 2 is a graphical representation of the characteristics obtained by the embodiment of the invention shown in FIG. 1.

Of course, the pressure $P_s$ is sufficient to act upon the ball member 106 of the second controller to maintain port 104b closed. The induction air under pressure $P_s$ is admitted into the chamber 68 of the valve assembly 60. The valve member 62 is then moved rightwardly in the drawing to partially or fully open the bypass conduit 50. It will be readily understood that the degree of opening the conduit 50 depends substantially upon the magnitude of the supercharge pressure $P_s$ which overcomes the diaphragm spring and atmospheric pressure. Thus, a portion of the exhaust gases is bypassed around the turbine to limit the supercharge pressure to a predetermined magnitude for instance below 400 mmHg as indicated in the graph of FIG. 2.

The level below which the supercharge pressure should be maintained is determined at will by appropriately selecting the load of the respective springs 90 and 70 and pressure acting areas of the diaphragms 88, 64, etc.

Upon deceleration with the throttle valve substantially closed, a vacuum develops in the induction passage section 18a downstream of the throttle valve, irrespectively of the pressure level of the passage section 18 upstream of the throttle valve. The vacuum is transferred into the chamber 94 to force the diaphragm 88 downward in the drawing, with the result that the plate member 86 blocks the port 72b, while opening the port 72a. Consequently, the vacuum prevails in the chamber 66.

In the second controller, on the other hand, the ball member 106 acted upon by the vacuum is forced leftwardly in the drawing against the spring and closes the port 104a. The atmospheric air is then admitted into the chamber 68 through the ports 104b, 104c. Due to the pressure difference established across the diaphragm 64, the bypass conduit 50 is now open permitting a portion of the exhaust gas to flow around the turbine. Since the supercharge pressure thus drops by an adequate amount, the engine can decelerate in quick response to the deceleration signal, i.e. when the throttle valve moves to the closed position.

Besides the bypass system for the exhaust gas as explained in the foregoing, the invention further incorporates an induction air recirculation around the compressor 32. The recirculation is given by a conduit 110 which connects the induction passage section between the throttle valve and the compressor to the section between the air flow meter 24 and the compressor. An air recirculation control valve 120 is interposed in the conduit 110. The valve 120 essentially consists of a valve member 122 and a valve spring 124 accommodated in a chamber 126 to load the valve member 122 to interrupt communication between the conduit 110 and the induction passage 18. Another conduit 130 is provided to connect the induction passage section 18a downstream of the throttle valve to the valve chamber 126 through a restricted orifice 130a.

During sudden deceleration, a high vacuum in the induction passage section 18a is transferred to the chamber 126 and acts upon the valve member 122 to move it leftwardly in the drawing with the aid of the higher pressure in the induction passage 18. The conduit 110 is thus opened to recycle a portion of the induction air under supercharge pressure into the upstream section of the compressor. As a result, the supercharge pressure is reduced for further improved response to deceleration operation.

Figure 3:
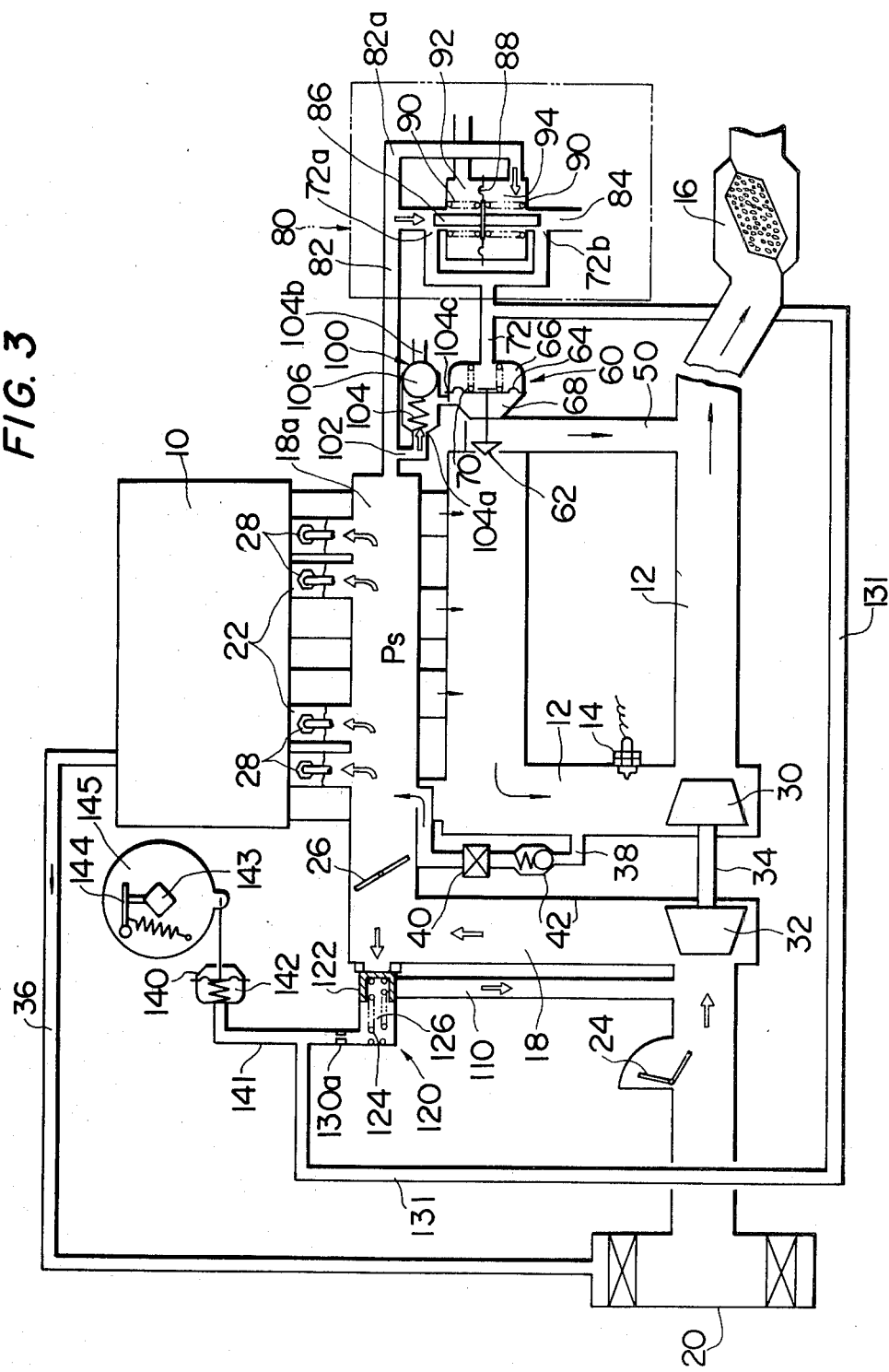
FIG. 3 is a view similar to FIG. 1 showing a second preferred embodiment of the invention.

FIG. 3 shows a modification to the induction air recirculation control in FIG. 1, wherein a conduit 131 derived from the conduit 141 opens to the conduit 72. When the supercharge pressure $P_s$ exceeds the predetermined magnitude, atmospheric pressure is transmitted into the chamber 126 through the conduit 131, while the supercharge pressure in the induction passage section between the throttle valve and the compressor directly acts upon the valve member 122. Consequently, the valve member 122 is urged leftwardly in the drawing against the spring 124 to open the valve 122.

Of course, the vacuum built up in the conduit 72 during deceleration or the like causes the valve 122 to open as in the embodiment of FIG. 1. It follows that according to this embodiment, the induction air recirculation takes place both in high speed operation and deceleration of the engine.

It may be noted that the recirculation air flows into the section downstream of the air flow meter 24 so that measuring the input air and fuel injection control in dependence on the measured value is not influenced by such recycling of the induction air.

It is also preferable to introduce the induction pressure in the induction passage section 18a into a pressure chamber 142 of a pressure differential operated ignition advance apparatus 140. For this purpose, a conduit 141 is connected between the conduit 130 and the pressure chamber 142. In practice, the ignition timing is retarded when a vacuum prevails in the section 18a such during idling, thus suppressing formation of NOx, while when the supercharge pressure is restored in the passage section 18a, the ignition timing is advanced to raise the output performance of the engine. The ignition advance system illustrated comprises known elements such as breaker cam 143, breaker contact arm 144 and breaker plate 145.

What is claimed is:

1. A waste gate control for an engine turbosupercharger having a turbine driven by gases exhausted from the engine to operate a compressor for supplying induction air to the engine through a throttle valve, said control comprising a passage for bypassing exhaust gases around the turbine, valve means in said passage for controlling fluid flow therethrough, means normally biasing said valve means toward a closed position, and means for operating to force said valve means to an open position in response to the induction pressure exceeding a first predetermined magnitude and the induction pressure falling below a second predetermined magnitude lower than said first predetermined magnitude, wherein said means for forcing said valve means comprises a first controller operatively responsive to the induction pressure for producing first, second and third pressure signals when the induction pressure exceeds said first predetermined magnitude, when the induction pressure falls below said second predetermined magnitude, and when the induction pressure is between said first and second predetermined magnitudes, respectively, a second controller operatively responsive to the induction pressure for producing fourth and fifth pressure signals when the induction pressure exceeds said first predetermined magnitude and when the induction pressure falls below said second predetermined magnitude, respectively, and means operable in dependence on the pressure difference between the pressure signals produced by said first and second controllers for moving said valve means to an open position.

2. A waste gate control for an engine turbosupercharger having a turbine driven by gases exhausted from the engine to operate a compressor for supplying induction air to the engine through a throttle valve, said control comprising a first passage for bypassing exhaust gases around the turbine, first valve means in said first passage for controlling fluid flow therethrough, means normally biasing said first valve means toward a closed position, means for operating to force said first valve means to an open position in response to the induction pressure exceeding a first predetermined magnitude and the induction pressure falling below a second predetermined magnitude lower than said first predetermined magnitude, a second passage connecting the outlet of the compressor to the inlet thereof around the compressor, second valve means in said second passage for controlling fluid flow therethrough, means normally biasing said second valve means toward a closed position, means for operating to force said second valve means to an open position in response to the induction pressure prevailing downstream of the throttle valve exceeding said first predetermined magnitude and the induction pressure falling below said second predetermined magnitude, and said means to open said first valve means comprising a first controller operatively responsive to the induction pressure for producing first, second and third pressure signals when the induction pressure exceeds said first predetermined magnitude, when the induction pressure falls below said second predetermined magnitude, and when the induction pressure is between said first and second predetermined magnitudes, respectively, a second controller operatively responsive to the induction pressure for producing fourth and fifth pressure signals when the induction pressure exceeds said first predetermined magnitude and when the induction pressure falls below said second predetermined magnitude, respectively, and means operable in dependence on the pressure difference between the pressure signals produced by said first and second controller for moving said first valve means to an open position.

3. A waste gate control as defined claim 2 in which said means to open said second valve means is responsive directly to the induction pressure in an induction passage section downstream of the throttle valve.

4. A waste gate control as defined in claim 2, in which said means to open said second valve means is in fluid communication with said first controller so as to be responsive to the pressure signals produced by said first controller.

5. In an internal combustion engine having a turbosupercharger which includes a turbine driven by hot exhaust gases exhausted from said engine and a compressor driven by said turbine for supplying induction air under pressure via a throttle valve into the induction manifold of said engine, a waste gate having a control system comprising a turbine bypass passage which by bypasses the hot exhaust gases around said turbine;

a valve disposed in said bypass passage for controlling the fluid flow through said passage, a first pressure differentially operated motor which is operatively connected to said valve for operating same, said motor having first and second variable volume chambers sealingly divided by a flexible diaphragm;

biasing means for biasing said valve toward a closed position;

a first controller which controls the pressure in said first variable volume chamber, said first controller having a first port which provides fluid communication between the atmosphere and said first variable volume chamber, a second port which provides fluid communication between said first variable volume chamber and the induction manifold downstream of the throttle valve, and a second pressure differentially operated motor which is operated by a pressure signal fed thereto from said induction manifold downstream of said throttle valve for positioning a first valve element to block said first port when fed a predetermined vacuum, for positioning said first valve element to block said second port when fed a predetermined positive pressure, and for positioning said first valve element such that said first and second ports are partially or fully open when fed a pressure between said predetermined vacuum and positive pressure; and a second controller which controls the pressure in said second variable volume chamber, said second controller having a third port which provides fluid communication between said second variable volume chamber and the atmosphere, a fourth port which provides fluid communication between said second variable volume chamber and the induction manifold downstream of the throttle valve, and a second valve element operative for normally permitting fluid communication between said fourth port and said second variable volume chamber and for moving to permit exclusive communication between said third atmospheric port and said second variable volume chamber when said predetermined vacuum prevails at said fourth induction port.

6. An internal combustion engine as claimed in claim 5, further comprising
a compressor bypass which includes
a compressor bypass passage which leads from a point immediately upstream of the throttle valve to a point immediately upstream of said compressor,
a valve having a third valve element biased to normally close said compressor bypass passage and having a valve chamber in fluid communication with said induction manifold downstream of said throttle valve so that, when said predetermined vacuum prevails in said valve chamber, a pressure differential between pressurized air from said compressor and said predetermined vacuum moves said third valve element to open said compressor bypass passage.

7. An internal combustion engine as claimed in claim 5, further comprising
a compressor bypass which includes
a compressor bypass passage which leads from a point immediately upstream of the throttle valve to a point immediately upstream of said compressor
a valve having a third valve element biased to normally close said compressor bypass passage and having a valve chamber in fluid communication with said first variable volume chamber such that, when said first valve element is positioned to block said first port, said predetermined vacuum is fed to said first variable volume chamber, whereby a pressure differential between said predetermined vacuum prevailing in said valve chamber and pressurized air from said compressor moves said third valve element to open said compressor bypass passage.

8. An internal combustion engine as claimed in claim 5, further comprising a device for retarding ignition timing of the engine when said predetermined vacuum prevails in said induction manifold downstream of said throttle valve, said ignition retarding device having a chamber fluidly communicating with said first variable volume chamber so as to be responsive to the pressure prevailing therein.

9. An internal combustion engine as claimed in claim 5, further comprising a device for retarding ignition timing of the engine when said predetermined vacuum prevails in said induction manifold downstream of said throttle valve, said vacuum retard device having a chamber in direct fluid communication with said induction manifold downstream of said throttle valve for receiving said predetermined vacuum.

10. An internal combustion engine as claimed in claim 5, further comprising a blow-by gas recirculation system having a blow-by gas recirculation conduit leading from a crankcase of said engine to a point upstream of said compressor.

11. An internal combustion engine as claimed in claim 5, further comprising an (EGR) exhaust gas recirculation system which includes an EGR conduit, and a one way-check valve and an ERG control valve disposed in said EGR conduit, said conduit leading from a point upstream of said turbine to a point in said induction manifold downstream of said throttle valve.

12. An internal combustion engine as claimed in claim 6 or 7, further comprising an electronically controlled fuel injection system which includes:
an air flow meter for detecting the amount of air inducted into the engine, said air flow meter disposed upstream of both said compressor and said compressor bypass passage;
an exhaust gas sensor for sensing exhaust gases from the engine, said exhaust gas sensor disposed upstream of said turbine; and
fuel injectors responsive to said air flow meter and said exhaust gas sensor for injecting an amount of fuel appropriate for producing exhaust gases having an air-fuel ratio suitable for treatment in one of an oxidation type catalytic converter and a three-way catalytic converter.

* * * * *